US005659881A

United States Patent [19]

Kent

[11] Patent Number: 5,659,881

[45] Date of Patent: Aug. 19, 1997

[54] DISTRIBUTED METHOD OF CALL ARBITRATION IN AN RF TRUNKING MULTISITE COORDINATOR ARCHITECTURE

[75] Inventor: James S. Kent, Lynchburg, Va.

[73] Assignee: Ericsson Inc., Research Triangle Park, N.C.

[21] Appl. No.: 208,665

[22] Filed: Mar. 11, 1994

[51] Int. Cl.[6] .................................................. H04Q 7/28

[52] U.S. Cl. .......................... 455/520; 370/329; 370/341; 455/526

[58] Field of Search .................................. 455/54.2, 54.1, 455/56.1, 57.1, 53.1, 33.1, 33.4, 34.1, 34.2; 370/58.3, 95.3, 852.6, 95.1, 329; 364/514

[56] References Cited

U.S. PATENT DOCUMENTS

| | | | |
|---|---|---|---|
| 3,832,689 | 8/1974 | Means et al. | 340/147 LP |
| 4,012,597 | 3/1977 | Lynk, Jr. | 455/54.2 |
| 4,510,599 | 4/1985 | Ulug | 370/85.6 |
| 4,750,109 | 6/1988 | Kita | 395/200 |
| 4,835,731 | 5/1989 | Nazarenko et al. | 379/63 |
| 4,903,321 | 2/1990 | Hall et al. | 455/34 |
| 4,905,302 | 2/1990 | Childress et al. | 455/34 |
| 5,200,954 | 4/1993 | Teel, Jr. et al. | 370/94.1 |
| 5,239,538 | 8/1993 | Teel, Jr. et al. | 370/58.3 |
| 5,253,253 | 10/1993 | Brame et al. | 370/85.11 |
| 5,363,315 | 11/1994 | Weiss et al. | 364/514 |
| 5,392,278 | 2/1995 | Teel et al. | 370/58.3 |
| 5,392,449 | 2/1995 | Shaughnessy et al. | 455/53.1 X |
| 5,398,248 | 3/1995 | Shepard | 455/33.4 |

FOREIGN PATENT DOCUMENTS

| | | |
|---|---|---|
| 0473355 | 3/1992 | European Pat. Off. . |
| 0579305 | 1/1994 | European Pat. Off. . |
| WO93/07723 | 4/1993 | WIPO . |
| WO94/17642 | 8/1994 | WIPO . |

*Primary Examiner*—Reinhard J. Eisenzopf
*Assistant Examiner*—Philip J. Sobutka
*Attorney, Agent, or Firm*—Nixon & Vanderhye, P.C.

[57] ABSTRACT

A method for resolving talk group call contention in a multi-site trunked radio frequency communications network is accomplished in a distributed manner by utilizing autonomous call arbitration processes at each interface node to avoid potential performance bottlenecking and a "single point of failure" configuration that would arise in a conventional centralized arbitration arrangement. Call contention in a multi-site environment occurs when multiple callers at different sites attempt to transmit on a common talk group at nearly the same moment. The call processing system that coordinates communications between sites must resolve this contention to ensure that the transmission is processed consistently at all sites. In accordance with the distributed manner of the present invention, each site interface autonomously determines which call should be given priority in a contention situation based upon a predetermined common set of arbitration "rules". The arbitration scheme can most succinctly be described as "first call wins, tie goes to the highest numbered site." Calls that lose contention are subsequently processed as "console-only" calls. In addition, the distributed arbitration method of the present invention also provides for the handling of "emergency" calls by giving those calls priority over non-emergency calls.

11 Claims, 10 Drawing Sheets

FIG. 2 MULTI-SITE ARCHITECTURE

BACKUP SITE DOWNLINK
ACTIVE SITE DOWNLINK
SITE AUDIO/DATA CHANNELS
SITE AUDIO/DATA CHANNELS
SITE AUDIO/DATA CHANNELS
SITE AUDIO/DATA CHANNELS
BACKUP CONTROLLER MODULE
CONTROLLER MODULE
AUDIO MODULE
AUDIO MODULE
AUDIO MODULE
AUDIO MODULE
HDLC LINK
AUDIO CONTROL
AUDIO TDM NETWORK
MESSAGE NETWORK
MIM
308
307
302
300
304(D)
304(C)
304(B)
304(A)
306(3)
306(4)
306(2)
306(1)
203
200
210
209

INTERFACE MODULE (NODE) CONTROLLER ARCHITECTURE
300
SERIAL DIAGNOSTICS PORT
HDLC PORT
307
ACTIVE SERIAL CONTROL PORT
316
STANDBY SERIAL CONTROL PORT
310
COMMUNICATIONS CONTROLLER
312
DUAL PORT RAM
INTERFACE CONTROLLER
314
308
PARALLEL AUDIO CONTROL PORT
209
CONTROL MESSAGE BUS (GSC)

END NODE
406
209a
209b
400
402
BUS TERM.
404
NODE 2
GSC BUS 1
GSC BUS 2
MOM BUS
GSC BUS SELECT
205
MOM
NODE 1
404
BUS TERM.

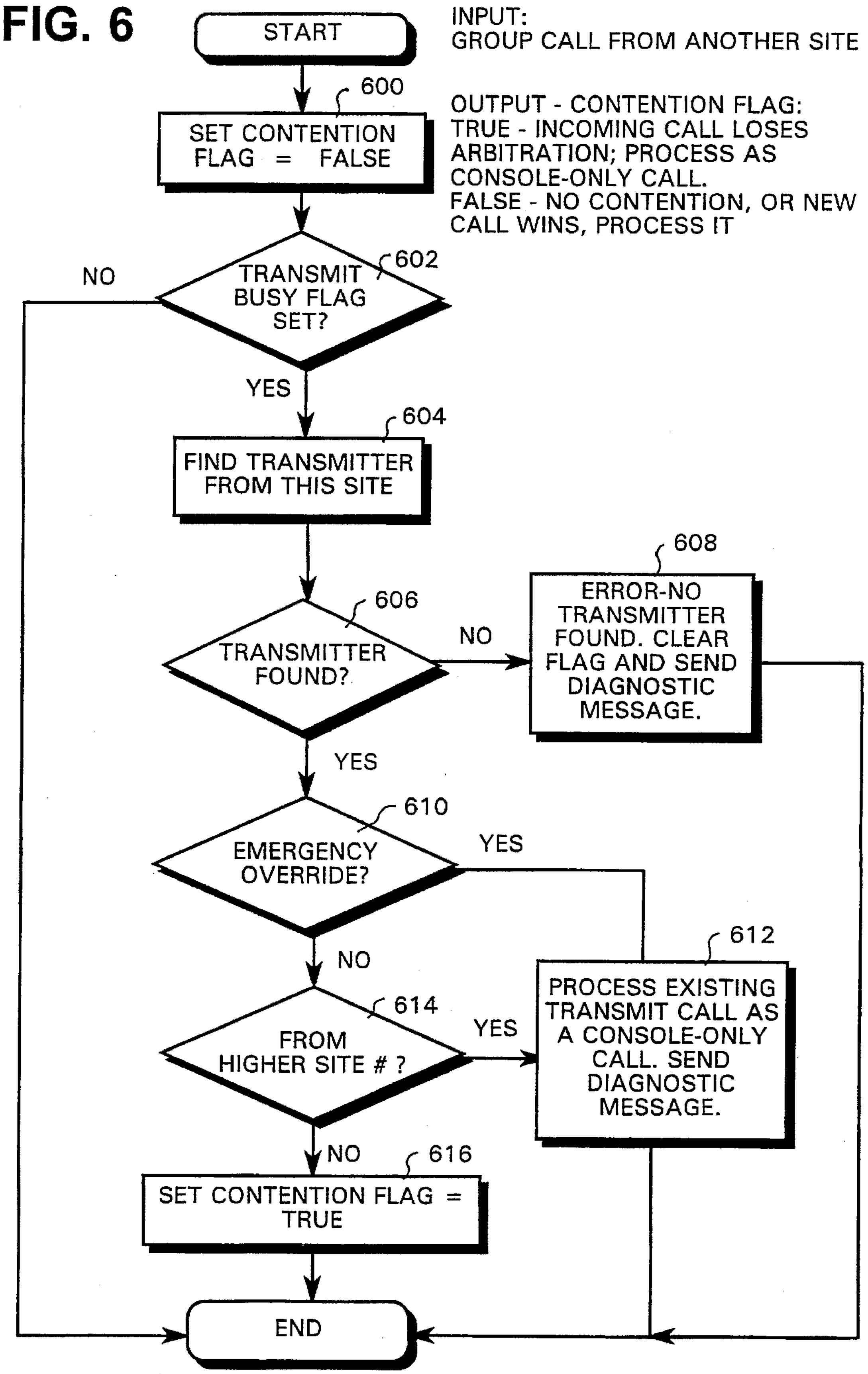
FIG. 6
START
INPUT:
GROUP CALL FROM ANOTHER SITE
600
SET CONTENTION FLAG = FALSE
OUTPUT - CONTENTION FLAG:
TRUE - INCOMING CALL LOSES ARBITRATION; PROCESS AS CONSOLE-ONLY CALL.
FALSE - NO CONTENTION, OR NEW CALL WINS, PROCESS IT
602
TRANSMIT BUSY FLAG SET?
NO
YES
604
FIND TRANSMITTER FROM THIS SITE
606
TRANSMITTER FOUND?
NO
608
ERROR-NO TRANSMITTER FOUND. CLEAR FLAG AND SEND DIAGNOSTIC MESSAGE.
YES
610
EMERGENCY OVERRIDE?
YES
NO
612
PROCESS EXISTING TRANSMIT CALL AS A CONSOLE-ONLY CALL. SEND DIAGNOSTIC MESSAGE.
614
FROM HIGHER SITE # ?
YES
NO
616
SET CONTENTION FLAG = TRUE
END

DISTRIBUTED METHOD OF CALL ARBITRATION IN AN RF TRUNKING MULTISITE COORDINATOR ARCHITECTURE

FIELD OF THE INVENTION

The present invention generally relates to a distributed control multisite switch architecture which coordinates digitally trunked radio frequency (RF), digital data and digital audio communications within a network of multiple sites, and, more particularly, to a distributed method of arbitrating talk group call contentions in a multisite system.

BACKGROUND AND SUMMARY OF THE INVENTION

Trunked RF repeater systems have become a mainstay of modern RF communications systems, and are used, for example, by public service organizations (e.g., governmental entities such as counties, fire departments, police departments, etc.). Such RF repeater systems permit a relatively limited number of RF communications channels to be shared by a large number of users—while providing relative privacy to any particular RF communication (conversation). Typical state-of-the-art RF repeater systems are "digitally trunked" and use digital signals conveyed over the RF channels (in conjunction with digital control elements connected in the system) to accomplish "trunking" (time-sharing) of the limited number of RF channels among a large number of users. A number of such systems are commercially available, such as the Clearchannel LTR system from E. F. Johnson and the Smartnet and Privacy Plus systems from Motorola.

Briefly, such digitally trunked RF communications systems include a "control" RF channel and multiple "working" RF channels. The working channels are used to carry actual communications traffic (e.g., analog FM, digitized voice, digital dam, etc.). The RF control channel is used to carry digital control signals between the repeater sites and user RF transceivers (radio units) in the field. When a user's transceiver is not actively engaged in a conversation, it monitors the control channel for "outbound" digital control messages directed to it. User depression of a push-to-talk (PTT) switch results in a digital channel request message requesting a working channel (and specifying one or a group of callees) to be transmitted "inbound" over the RF control channel to the repeater site. The repeater site (and associated trunking system) receives and processes the channel request message.

Assuming a working channel is available, the repeater site generates and transmits a responsive "outbound" channel assignment digital message over the RF control channel. This message temporarily assigns the available working channel for use by the requesting transceiver and other callee transceivers specified by the channel request message. The channel assignment message automatically directs the requesting (calling) transceiver and callee transceivers to the available RF working channel for a communications exchange.

When the communication terminates, the transceivers "release" the temporarily assigned working channel and return to monitoring the RF control channel. The working channel is thus available for reassignment to the same or different user transceivers via further messages conveyed over the RF control channel. An exemplary "single site" trunked RF repeater system of this type is disclosed in commonly-assigned U.S. Pat. Nos. 4,905,302 and 4,903,321.

Single site trunked RF repeater systems may have an effective coverage area of tens of square miles. It is possible to provide one or more satellite receiving stations (and a single high power transmitting site) if a somewhat larger coverage area is desired. However, some governmental entities and other public service trunking system users may require an RF communications coverage area of hundreds of square miles. In order to provide such very large coverage areas it is necessary to provide multiple RF repeater sites and to automatically coordinate all sites so that a radio transceiver located anywhere in the system coverage area may efficiently communicate in a trunked manner with other radio transceivers located anywhere in the system coverage area.

FIG. 1 is a schematic diagram of a simplified exemplary multiple-site trunked radio repeater system having three radio repeater (transmitting/receiving) sites S1, S2, and S3 providing communications to geographic areas A1, A2, and A3, respectively. Mobile or portable transceivers within area A1 transmit signals to and receive signals from site S1; transceivers within area A2 transmit signals to and receive signals transmitted by site S2; and transceivers within area A3 transmit signals to and receive signals transmitted by site S3. Each repeater site S1, S2, S3 includes a set of repeating transceivers operating on a control channel and plural RF working channels. Each site may typically have a central site controller (e.g., a digital computer) that acts as a central point for communications in the site, and is capable of functioning relatively autonomously if all participants of a call are located within its associated coverage area.

However, to enable communications from one area to another a switching network, as for example the assignee's "multisite switch" ("multisite coordinator") described herein, must be provided to establish audio and control signal pathways between repeaters of different sites. Moreover, such pathways must be set up at the beginning of each call and taken down at the end of each call. For example, the site controller (S1) receives a call from a mobile radio in A1 requesting a channel to communicate with a specific callee. A caller requests a channel simply by pressing the push-to-talk (PTT) button on his microphone. This informs the site controller S1 via an "inbound" digital control message transmitted over the RF control channel that a working or audio channel is requested. The site controller assigns a channel to the call and instructs the caller's radio unit to switch from the control channel to the audio channel assigned to the call. This assigned channel is applicable only within the area covered by the site.

In addition, the site controller sends the channel assignment to the multisite switch (200) which assigns an internal audio slot to the call. The multisite switch also sends a channel request over a control messaging bus to other site controllers having a designated callee within their site area. Audio signals are routed such that audio pathways are created to serve the callee(s) and one or more dispatcher consoles 202 involved in the communication. Upon receiving a channel request, these "secondary" site controllers (in the sense they did not originate the call) assign an RF working channel to the call. Each secondary channel is operative only in the area covered by the secondary site controller. The secondary site controller(s) also sends the channel assignment back up to the multisite switch.

Thus, the caller communicates with a unit (or a group of designated units referred to as a "talk group") in another area via the multisite switch. The call is initially transmitted to the primary site controller, routed through an assigned audio slot in the multisite switch, and retransmitted by the secondary sites on various assigned channels in those other areas. When the call ends, the primary site controller deactivates the assigned channel for that site and notifies multisite switch 200 that the call is terminated. The multisite switch propagates an end of call command ("channel drop") to all other site controllers. This releases all working channels assigned to the call and breaks the associated audio routing pathways.

The multisite switch has a distributed control architecture. The logical functions and computational workload of the multisite switch are shared by various distributed microprocessor "nodes". Each node is connected either to a site controller 102, dispatch console 202, public and/or private landline telephone exchanges and other components of the particular communications system. Most nodes function as switch interfaces and include, for example, Master Interface Modules (MIMs) for nodes coupled to site controllers and Console Interface Modules (CIMs) for nodes coupled to dispatch consoles. Each interface module is supported by a controller card that utilizes several microprocessors. All of the cards have substantially the same hardware and are interchangeable. Each card acts as a gateway interface into the distributed control switch network.

Detailed description and operation of the multisite switch, generally, is set forth in commonly assigned U.S. patent application Ser. No. 07/658,844 filed Feb. 22, 1991 entitled "Distributed Multisite Switch Architecture", the disclosure of which is also incorporated herein by reference.

In addition to providing communications between mobile radio units in different areas, multisite switch 200 provides communications between land-line telephone subscribers and radio units as well as dispatchers and mobile radio units. Land-line telephone subscribers can communicate with radio units by dialing an access number as well as a radio unit (or group) identification number which is routed to the trunked communications system through a central telephone interconnect switch (CTIS) 212 and multisite switch 200. One or more dispatch consoles 202 is connected to the multisite switch in the same manner as the site controllers 102. Both land-line subscribers and dispatch console operators can issue a channel call request through the multisite switch to a site controller 102 to call for example a mobile radio unit.

Each dispatch console 202 may participate in calls in its area. Thus, when a call comes through the multisite switch from another area to a mobile radio, the switch informs the dispatch console 202 of the call in addition to notifying the corresponding site controller 102. The dispatch operator can then listen or participate in the call. Multisite switch 200 also handles calls to groups ("talk groups") of mobile units and/or dispatch consoles by ensuring that the associated site controllers for all of the callees in a particular called group assign a working channel to the group call.

The present invention particularly relates to a distributed method of arbitrating talk group call contentions in a multisite system. Call contention in a multisite environment occurs when multiple callers at different sites attempt to transmit on a common talk group at nearly the same moment. The call processing system that coordinates communications between sites (site controllers) must resolve this contention to ensure that the transmission is processed consistently at all sites. On a multisite talk group it is unacceptable to have some of the listeners hear one transmitter while others are hearing something else.

Initial attempts to solve this problem included summing the audio from all transmitters at the multisite switch. This assures that transmissions are heard but results in potentially confusing audio transmissions with more than one voice being heard at a time. In addition, for voice guard calls summation of the transmissions from the radios is not feasible since it will interfere with encryption/decryption process of the call. Similarly, for digital data calls summation of multiple transmissions is unacceptable since it would invalidate the data from each transmitting station.

Conventionally, using a central arbitrator is one approach to solving contention problems. If all calls are single threaded at one point through a central arbitrator, the arbitrator can select the first transmitter, then deny other transmitters until the first caller is finished. However, the central arbitrator method results in at least the following significant problems when implemented in a distributed control call processing system such as a multisite switch: 1) call processing nodes in the system must communicate with the arbitration unit for each call, which adds a significant call processing overhead to each call whether call contention occurs or not; and, 2) single threading calls through a central arbitration routine creates a single point failure mode for the call processing system.

Accordingly, the present invention resolves talk group call contention between sites in a multisite system by utilizing distributed call arbitration processes to avoid the performance bottleneck and the "single point of failure" mode that would arise from using a conventional central arbitration scheme. More specifically, the present invention utilizes a distributed approach to contention arbitration wherein each site interface autonomously determines which call should be given priority in a contention situation based upon a predetermined common arbitration scheme. This scheme can most succinctly be described as "first call wins, tie goes to the highest numbered site." In addition, the arbitration method in accordance with the present invention provides for handling "emergency" calls by giving those calls priority over non-emergency calls.

BRIEF DESCRIPTION OF THE DRAWINGS

These and other features and advantages of the present invention will become more completely understood by referring to the following detailed description of presently preferred exemplary embodiments in conjunction with the FIGURES in which like reference numerals refer to like elements throughout:

FIG. 6 is a processing flow diagram illustrating Transmit Call contention arbitration;

DETAILED DESCRIPTION OF THE DRAWINGS

Figure 1:
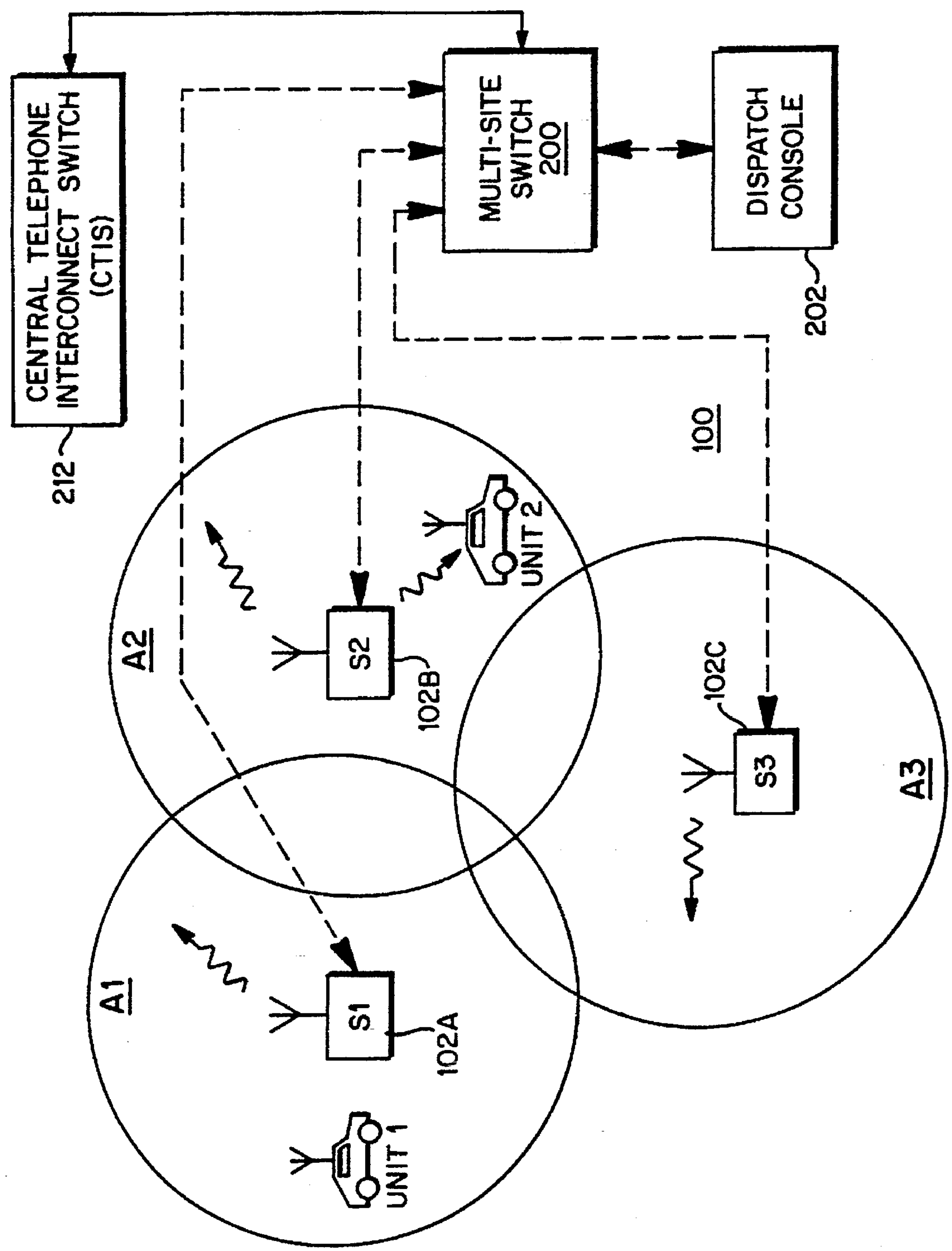
FIG. 1 is a schematic illustration of an exemplary multisite trunked RF communications system.

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well known methods and programming procedures, devices, and circuits are omitted so as not to obscure the description of the present invention with unnecessary detail. An exemplary trunked radio repeater system 100 in accordance with the invention was generally described above and is depicted in FIG. 1. In exemplary multisite system 100, for example, the site controller (S1) receives a call from a mobile radio in coverage area A1 requesting a channel to communicate with a specific callee or group of callees. The caller requests the channel simply by pressing the push-to-talk (PTT) button on the microphone of his remote RF transceiver. This informs the site controller (e.g., via an "inbound" digital control message transmitted over the RF control channel) that an audio working channel is needed. The site controller assigns a working channel to the call and instructs the caller's radio unit to switch from the control channel to the assigned working channel. This assigned working channel is thus ready to support communications within the area covered by the site.

In addition, the site controller sends a message indicating the channel assignment to multisite switch 200. The switch, in turn, sends a channel request to all other site controllers and routes audio signals such that an audio signal pathway is created between the RF repeater servicing the caller and the RF repeater(s) servicing the callee(s). Additional audio signal pathways may also be established in similar fashion such that one or more dispatch consoles 202 and land-line subscribers may become involved in the communication. Upon receiving a channel request message, these "secondary" site controllers may each assign an RF working channel to the call (e.g., if a callee designated by the caller's channel request message happens to be physically located within the coverage area serviced by the associated RF transceiving site). Meanwhile, multisite switch 200 ensures that the caller's audio has been routed from the active RF receiver of site S1 to active transmitters of each of the other sites participating in the call.

Figure 2:
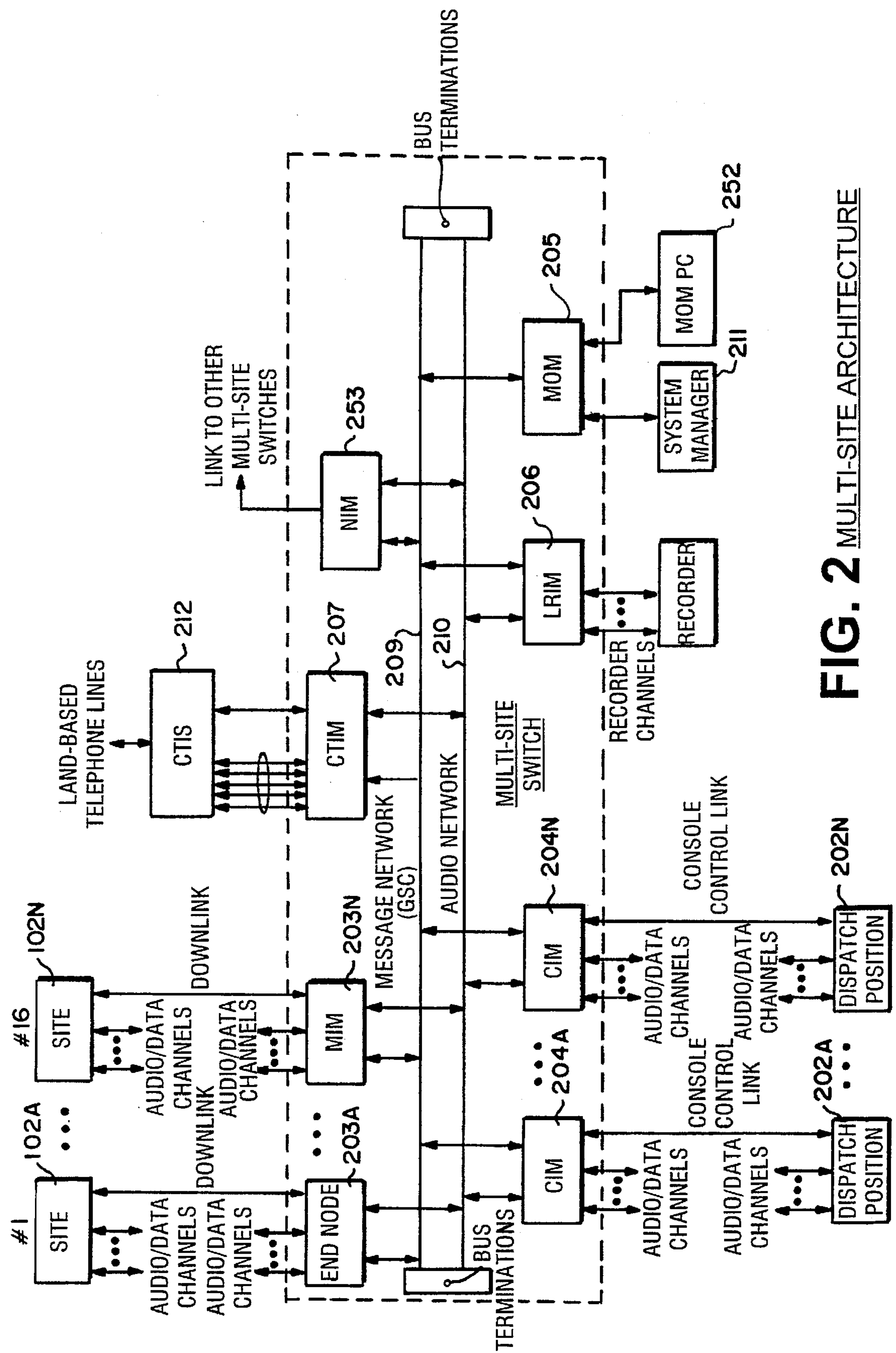
FIG. 2 is a schematic of an exemplary architecture for a distributed, digitally trunked, RF communications multisite switching network.

FIG. 2 is a detailed schematic diagram of the architecture of multisite switch 200 provided by the presently preferred exemplary embodiment of this invention. The multisite switch 200 communicates with each site controller 102 and dispatcher console 202 via data and audio communication lines which may include dedicated land lines or microwave links.

The multisite switch 200 establishes and removes audio connections between sites 102 and dispatch consoles 202 using a local area network of communication interface nodes (e.g., MIMs, CIMs, NIMs, CTIM, and MOMs). As shown in FIG. 2, the nodes are labelled corresponding to whether they interface with a site controller, dispatch console, landline telephone switch, another multisite switch or some other system component (or as in the case of MOM 205 perform some other control function). For example, MIMs 203 are interface modules in the switch that interface with site controllers and CIMs 204 are nodes that interface with dispatch consoles. The MOM supervises control communications distributed over the control message bus and interfaces a system manager, 211, and a MOM PC (personal computer), 252, which have supervisory responsibility for multisite switch 200 and the overall radio communications system as connected through the switch. The LRIM (206) interfaces recorders to the switch assigned to log calls for various groups or units. The CTIM (207) functions much the same as a MIM with respect to interfacing a site to the multisite switch except that it interfaces to landline telephone lines from Central Telephone Interconnect Switch (CTIS) 212 to switch 200. The Network Interface Module (NIM) interfaces one multisite switch 200 to another multisite switch at another similar radio communications system to provide an even greater coverage area.

Each node in the multisite switch is supported by a microprocessor-based controller module. All of the switch interface nodes (i.e., the MIMs, CIMs, CTIM, MOM, LRIM, and NIMs) have the same hardware and are interchangeable. However, the nodes each have different software configured "personalities" and responsibilities depending on the particular interface functions that they are specifically assigned to perform as, for example, a site controller interface or a dispatch console interface, etc. Each node can be easily configured to be a MIM, CIM, etc. by setting a few switches.

As shown in FIG. 2, the nodes of multisite switch 200 are connected into a control message network 209 and a digital audio (TDM) network 210. The control message network is preferably a message network employing a conventional Global Serial Channel (GSC) digital messaging protocol, for example, as implemented using an Intel 80C152 GSC microprocessor. The GSC microprocessor is used as the communications controller in the controller module in each node and is essentially dedicated to performing I/O functions for the node. Control message bus 209 is basically a high speed data bus that interconnects the communication/control processors of each node.

Audio network bus 210 may comprise up to thirty-two (32) time division multiplexed (TDM) buses in the present invention. Each bus contains thirty-two (32) slots, each slot corresponding to a single audio channel. Therefore, as many as 1024 audio slots may be routed through the multisite switch (i.e., 32 buses×32 slots), although some of the slots are used for other purposes (e.g. signalling). In the presently described exemplary embodiment, eight (8) buses are provided and only 240 channels of digitized audio are carried by audio TDM network 210.

MOM 205 is the interface module for System Manager 211 and MOM PC (personal computer) 250. The System Manager updates databases maintained in all of the nodes. The MOM 205 maintains certain specialized databases including databases for smart calls, confirmed calls, and activity status of every node in the network. Smart calls relate to the operation of the dispatch console 202. A call is "smart" if the call is selected by the dispatcher via a select speaker in the console 202. A confirmed call is one for which the audio channel and slot assignments must be confirmed before the caller begins talking. A node's status (e.g., active or inactive) is monitored periodically by the MOM. Polling messages from the MOM addressing specific blocks of nodes are transmitted over control message bus 209. Each node monitors the control message bus to determine if its address falls in the range currently being addressed. If it is, the node responds to the poll by sending a Node Access Message (NAM) over the message bus to the MOM. The MOM then correlates each received NAM with its corresponding node of origin to record its active status in the node activity status data base.

As part of the multisite switch initialization procedure, the nodes connect their assigned TDM bus slots to the node's external channel inputs. For example, a MIM will assign each channel from its site controller to a separate audio TDM bus slot on audio network 210. Once the TDM bus slot is linked to the site channel, the bus slot continuously receives the output from the channel through the host node without requiring further channel setup. Of course, the site channel has no intelligible signal until it is assigned to a call by the site controller. Although a TDM bus slot is linked to a corresponding site channel, no other nodes (MIM, CIM, etc.) listen to that bus slot until the host node sends a slot assignment message throughout multisite switch 200 over message network bus 209 notifying all nodes that an active call from the site has been assigned to that bus slot.

Figure 3:
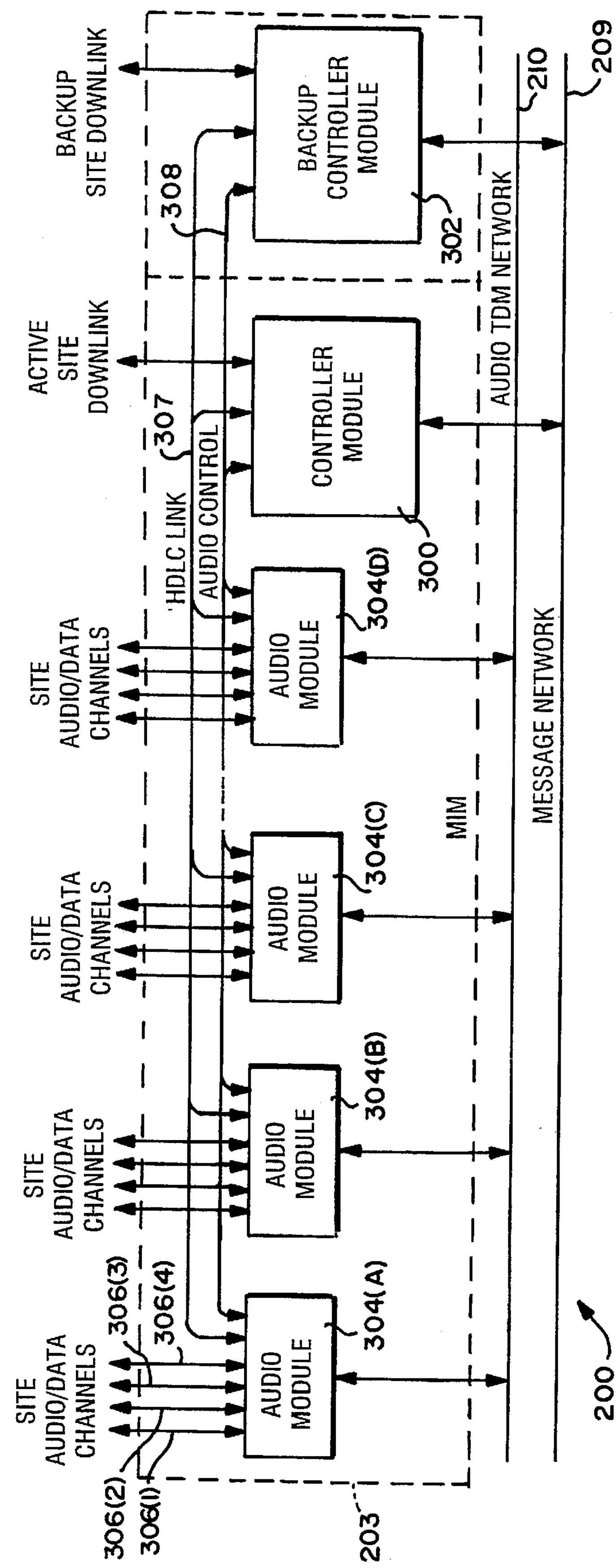
FIG. 3 is a detailed block diagram of a single exemplary node (with multiple audio sources/destinations) shown in FIG. 2.

FIG. 3 is a high level block diagram of a single (multiple audio channel) exemplary MIM 203 provided by the presently preferred exemplary embodiment of this invention. The architecture of other nodes is virtually the same as that for the MIM. As mentioned above, the "highway" used to communicate signals between interface modules includes an audio (TDM) network 210 and a control message network ("GSC") 209. The TDM audio bus simply transfers whatever digital information is placed on the TDM bus slot. MIM 203 typically services multiple RF channels providing multiple audio source/destinations each of which are connected independently to a TDM bus slot.

MIM 203 includes a controller module 300, a backup controller module 302, and plural (preferably eight) audio modules 304 (only four are shown for purposes of illustration). Each audio module 304 in the preferred embodiment is connected to a maximum of four RF repeaters of an RF trunking site, or in the case of a CIM and a CTIM (for console and landline communications) to four bidirectional audio links. For example, audio module 304(A) includes bidirectional audio links 306(1)–306(4) serving associated first through fourth trunked RF repeater site "channels" (i.e., RF transceiving/repeating decks associated with particular trunked RF channels). The audio modules 304 act as source gateways ("entrance/exit ramps") which convert analog audio signals generated by MODEMs from the trunked repeater sites into digitized audio (PCM) signals and place the digitized audio signals onto the audio TDM network 210. These same audio modules 304 act as audio destinations by taking selected signals from the audio TDM network 210, converting them from digital into analog form, and providing the resulting analog signals to the RF repeater site "channels" for transmission via RF links.

Controller module 300 communicates with each of the four audio modules 304 via a common HDLC link 307 and an audio control link 308. The HDLC link 307 is used, for example, to carry fault indications and messages relating to RF "channel" status between audio modules 304 and controller module 300. Audio control link 308 permits the controller module node 300 to set channel parameters (e.g., level adjustment, TDM slot assignment, etc.) within each audio module 304.

Detailed description and operation of the audio modules 304 is set forth in commonly assigned U.S. patent application Ser. No. 07/658,636 entitled "Audio Routing Within Trunked Radio Frequency Multisite Switch" fled on Feb. 22, 1991 and incorporated herein by reference.

Figure 4:
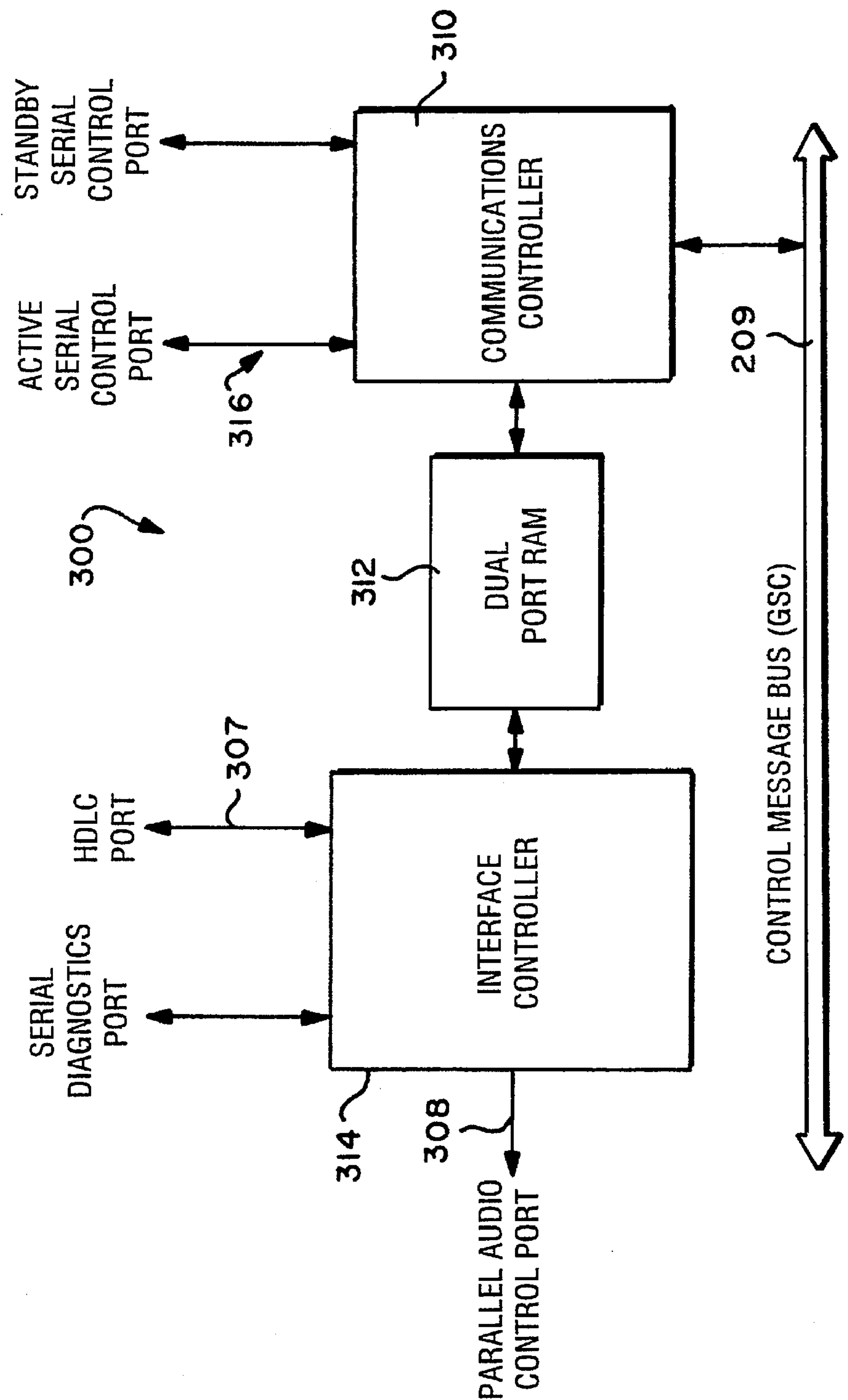
FIG. 4 is a block diagram illustrating the node (interface module) data processing and control message bus architecture.

FIG. 4 shows a block diagram of an exemplary architecture for node controller 300. Each node controller 300 includes a communications controller 310, a dual-port random-access-memory (RAM) 312 and an interface processor 314. Communications controller 310 receives and routes control messages between the control message bus 209 and interface processor 314. Communications controller 310 may be, for example, an Intel 80C152 GSC microprocessor. Dual-port RAM 312 is used to communicate between the communications controller and the interface controller. Messages received from site controller 102 over the serial port 316 are translated into a format usable by the multisite switch. The communications controller 310 also translates multisite switch messages into a format that the site controller or console understands.

Interface processor 314 performs substantially all the logical functions for the node (interface module) and is effectively the "intelligence" of MIM 203. Interface processor 314 (which may be, for example, an Intel 80C186 microprocessor) initially assigns TDM bus slots to channels for the individual RF transceivers associated with audio links 306(1)–306(4) of audio modules 304 using parallel audio control bus 308. The interface processor sets up the connection between a site RF channel (or an audio/data channel at a dispatcher console or a CTIS) and the audio slots on the multisite switch TDM audio bus to establish a communications link for a call and also terminates the link when a call ends. As previously described, each MIM is preassigned a set of TDM bus slots for outputting audio signals onto the TDM bus, and these slots are not assigned and de-assigned during the course of normal call routing. A more detailed description of the node controller architecture is provided in commonly assigned U.S. Pat. No. 5,239,538 to Gulliford et at., entitled "Controller Architecture for an RF Trunking Multisite Switch", which is incorporated herein by reference.

Each call through multisite switch 200 is patched from its assigned TDM bus slot on the audio bus 210. Since the interface processor for each node autonomously assigns slots, connects audio slob to its associated site controller or dispatch console etc. to establish a communications link, and also terminates calls and de-assigns slots, the nodes must continually inform each other of slot activity when a call involving a particular slot becomes active. Accordingly, the nodes send control messages regarding slot assignments, slot updates and slot idles over the control message network 209 to other nodes.

The communications controller (310) for each node initially processes all of the messages on the GSC message network (209). Current slot assignments made by other interface are forwarded to the interface processor (314) through a dual-port RAM (312). The communications controller also processes slot update and slot idle messages by referring to a slot bit "map" or database, located and maintained in the dual-port RAM, for all TDM bus slots on the audio bus. By referring to the slot bit map, the communications controller determines whether the slot status message conveys information already known, or if the slot status message conveys new information about a TDM bus slot. Update messages are sent regularly by the nodes hosting calls to confirm to other nodes the active status of a slot. When a host terminates a call, it sends a "slot idle" message to the other nodes and also periodically resends idle messages until the slot is involved in another call. Thus, all nodes are continually informed of the status of all TDM bus slob that have been assigned at least once. A more detailed description of the slot bit map and slot status messages is provided in commonly assigned application Ser. No. 07/658,640 filed on Feb. 22, 1991 entitled "Message Bus Slot Update/Idle Control and RF Trunking Multisite Switch" which is incorporated herein by reference.

Each MIM is coupled to its site controller through a standard serial telephone line or other transmission media. MIMs receive digital command signals from their site controllers 102 through a downlink line as is described in commonly assigned U.S. Pat. No. 4,835,731, entitled "Processor-To-Processor Communications Protocol For A Public Service Trunking System" also incorporated by reference.

Each MIM also maintains a radio unit database that identifies the radio units within its site and the groups that correspond to active calls. These databases are set up by the system manager 211 (FIG. 2) and sent to all interface modules. The radio unit database identifies each mobile radio unit in the wide area system. For each MIM, some of the mobile units will be in its assigned site area and others will be outside of its area. Each MIM keeps track of which units are in its area and, in addition, which talk group(s) is currently selected by the unit. A "talk group" is a collection of units that communicate together on a single call. For example, there may be a group for the fire department that allows all of the fire trucks to listen/talk to the central dispatcher or the fire chief. The dispatcher programs this group into his console to broadcast messages to all fire trucks. Similarly, groups can be established for rescue stations, police units assigned to a particular precinct, and many other combinations of users of the public service radio system.

Since each mobile unit may be capable of participating in several different talk groups, the mobile unit operator selects (e.g., via the unit front panel controls) the desired group at any particular time. Whenever a call comes in for the selected group, the mobile unit will then receive the call.

When a unit enters a new site area, a "log-in" message is sent from its new site controller to the corresponding MIM identifying the unit and its currently selected group(s). The MIM receiving the login signal through its serial control port 304 (i.e., from the site controller via the site downlink) increments the group "count" within its database for the unit's selected group(s). Similarly, when a unit leaves an area, the corresponding MIM logs the unit out of its database by decrementing the current count of the unit's corresponding group(s). In addition, when a unit changes groups, it sends a group login message that causes the MIM for its area to increment the count for the newly selected group and decrement the count of the old group.

The procedures followed by the multisite switch 200 in activating a call from a radio unit and from a dispatcher console, confirming receipt of the call request, and terminating the call are now briefly described. A more detailed description of the messaging and protocols involved in the call setup and takedown procedures is provided in commonly assigned U.S. Pat. No. 5,200,954 entitled "Communication Link Between Multisite RF Trunked Network and an Intelligent Dispatcher Console," the disclosure of which is incorporated herein by reference.

A "primary" MIM receives a radio unit originated channel assignment from its corresponding site controller. This signal indicates that a mobile unit in the area assigned to that MIM wants to call another unit or talk group and its site controller has assigned a channel to the call for its area. The MIMs assigned to callees are "secondary" MIMs. The channel assignment is sent to the multisite switch as described above and received in the MIM by the communications controller 310 as are all communications from outside of the multisite switch. The MIM translates the site channel assignment into a TDM bus slot assignment for use within the multisite switch and that slot assignment is sent to all other interface modules and components via the GSC bus. The primary MIM logs that TDM bus slot (i.e. channel) as active and also performs slot status updating tasks by sending slot status update messages to the other interface modules.

More specifically, referring again to FIG. 2, the MIM responds to the site originated TDM bus slot assignment by sending messages on the multisite switch message bus 209. A TDM slot assignment message is sent to all multisite switch components (e.g., interface modules or "nodes") identifying the TDM bus slot on the audio bus 210 that is assigned to the call. Upon receipt of the slot assignment message, each CIM (204) looks through its database to determine if the callee is programmed at its corresponding console 202. If the callee is programmed and the channel assignment message indicates that the audio is not encrypted, CIM 204 connects its corresponding dispatch console 202 to the audio slot for the call. In this way, the dispatch console can monitor all unencrypted calls involving groups or units that have been programmed by the dispatcher. The MOM (205) sets up group calls, informs CIMs of "smart" calls, and tracks which calls have been "selected" by a dispatch console. The "secondary" MIMs receive a TDM bus slot assignment and a slot update from a "primary" MIM. Each MIM checks its unit database to determine whether the callee(s) is listed as being in its area. If the callee(s) is not in its area, then the MIM does nothing. If there is a callee(s) in its area, the MIM is designated as a secondary MIM and sets the assigned TDM bus slot bit (or clears the bit if the slot assignment says the channel is dropped) on the bit map database maintained in its RAM (312) to stop subsequent updates from being sent to the interface processor (314).

Figure 5:
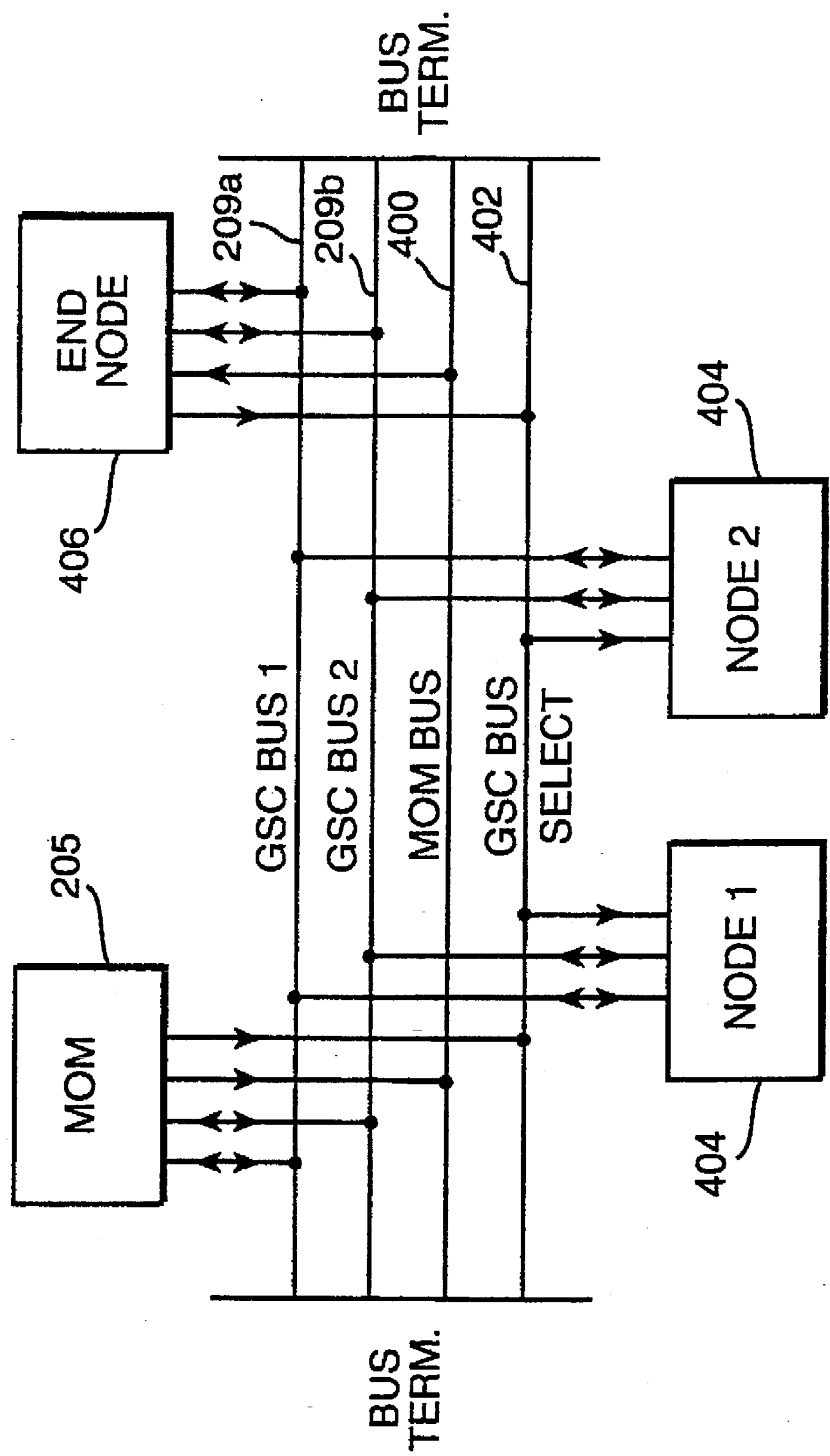
FIG. 5 is a block diagram showing the various control buses employed in the control messaging network of the multisite switch.

Physically, each node is essentially a circuit card or board which is inserted into a centralized interconnect terminal which includes a back plane having all of the necessary hardware connections between the nodes, e.g., power, data, and control buses. Each node has a unique node identification number that may be dynamically assigned. In addition, DIP switches on each node card can be manually set to indicate whether that node is an "end node" (i.e., a node located at a physical "end" of message network bus 209 in the multisite switch). FIG. 5 symbolically represents the configuration of nodes connected to the back plane. As depicted, two GSC message buses **209*a* and 209*b* are bidirectionally connected to each node. End node 406 and GSC BUS 209*b* are provided for bus failure (i.e., break detection and prevention). In the preferred embodiment, the nodes are configured such that MOM 205 is inserted at one end of the back plane at one bus termination (e.g. the left end in FIG. 5), and an end node 406 is connected to the opposite end of the back plane (e.g. the right end in FIG. 5). Between MOM 205 and end node 406, the remaining nodes represented by nodes 1, 2, etc. (404) are bidirectionally hardwire-connected to the GSC buses 209*a* and 209*b*. All of the nodes including MOM 205 and end node 406 are also connected to a GSC bus select line 402** used to coordinate uniform node switching from one GSC control message bus to the other whenever required. A more detailed description and operation of the MOM is provided in commonly assigned U.S. application Ser. No. 08/084,944, filed Jul. 2 1993, entitled "A Multisite Trunked RF Communication System With Reliable Control Messaging Network" and incorporated herein by reference.

As previously discussed above, call contention in a multisite environment can occur when multiple callers at different sites attempt to transmit on a common talk group (Call Group) at nearly the same moment. In accordance with the present invention, talk group call contention between sites in a multisite system is resolved by utilizing distributed call arbitration processes to avoid the potential performance bottleneck and "single point of failure" mode that would arise from a conventional central arbitration scheme. More specifically, the present invention utilizes a distributed approach to contention arbitration wherein each site interface autonomously checks for contention and resolves occurrences by determining which call should be given priority based upon a predetermined common arbitration scheme. This scheme can most succinctly be described as "first call wins, tie goes to the highest numbered site." (A unique site identification number must be pre-assigned to each site upon initial network configuration.) In addition, the arbitration method in accordance with the present invention provides for handling "emergency" calls by giving those calls priority over non-emergency calls.

As also previously discussed above, the site interfaces (e.g., MIMs and other interface modules) in the multisite switch maintain a distributed "tracking" database for all possible talk groups. In accordance with the present invention, this database is expanded to include information required to detect call contention situations. Contention arbitration is necessitated—and implemented—at each site interface for any call received via the multisite switch (coordinator) which is directed toward a particular talk group for the locally associated transceiver site when that site is already transmitting to the same talk group or for a radio (mobile unit) originated call received at the locally associated transceiver site for a particular talk group that is already busy in a call on another site. In accordance with the contention arbitration scheme of the present invention, calls winning the contention arbitration are processed while calls losing contention arbitration are routed as a "console-only call" (i.e., routed to a dispatch position/operator's console).

In an exemplary embodiment of the present invention, a "receive busy" flag and a "transmit busy" flag are included in the distributed database at each site for each talk group. These flag bits are autonomously set at each site interface (i.e., interface module) upon initiation of a transmit call or receive call request for a talk group(s), and then subsequently cleared upon receipt of an unkey/drop signal. The transmit busy flag is set for a talk group whenever a mobile radio originated call is received from the talk group from the site and cleared when the mobile radio unit caller "unkeys" the push-to-talk button. The receive busy flag is set for a talk group on receipt of a call from another site (i.e., via the multisite switch) and cleared when the caller "unkeys". Also, the receive busy flag is set even if the site does not pick up the call. This prevents the site from transmitting on top of the call later. For example, assuming a site does not have any units tracked at the start of a call, if a mobile unit then subsequently switches to the site while the call is in progress it still must not be allowed to transmit on top of the existing call.

Accordingly, each site interface autonomously resolves contention for the following two situations:

1) Receive Call contention arbitration: Occurs whenever a call from another site is received, and the talk group has the transmit busy flag bit set. This situation is resolved by comparing the originating transceiver site number of the new call to the site number of the transceiver site assigned to the interface module (i.e., the locally associated site). Unique site identification numbers are preassigned to each site upon initial network configuration. The higher site number receives priority for the call unless one of the calls is an emergency. The call from the lower number site is routed as a "console-only call". A "console-only call" will only be picked up by interface modules functioning as an interface to an operator's console (dispatch position). An emergency call, however, always wins contention arbitration over a non-emergency call.

2) Transmit Call contention arbitration: Occurs whenever a radio originated call is received from the locally associated transceiver site and the talk group has the receive busy flag bit set. In this case, unless it is an "emergency" call, the site interface routes the call as a "console-only call", since somebody has already initiated a call in the talk group. As above, an emergency call always wins contention arbitration over a non-emergency call.

The arbitration procedures autonomously implemented by each site interface module are now discussed in greater detail with reference to FIGS. 6 and 7. These procedures check the Receive Busy and Transmit Busy flags for each call group in the tracking database and utilize a "contention" flag to indicate whether a contention situation is existent. FIG. 6, for example, shows an exemplary processing flow diagram illustrating Receive Call contention arbitration. This procedure is called on receipt at a site interface of a call from another site via the multisite coordinator. It checks for contention with an existing transmit call from the local site. (Note that the site interface must process its transmit call as a "dispatch position console-only call" if it loses arbitration with the call from the other site).

Referring now to the processing flow diagram of FIG. 6, a contention flag is first set to "FALSE" (block 600). The "contention flag" is a local variable that is set FALSE at the start of the routine and is merely used to keep track of the current contention state based on examining the CALL__RCV, CALL__XMT and emergency status of the current call(s). Next, the Transmit Busy flag for the called group(s) is checked in the tracking database (decision block 602). If this site is not already transmitting a call for that group(s) (i.e., Transmit Busy flag clear) then the call is allowed. Otherwise, the database is checked to identify a transmitting unit from that site (block 604). If a call is received from another site for a talk group that has its transmit busy flag set, but no call on the talk group from the site can be identified (decision block 606), a diagnostic/warning message is generated (block 608). Since no actual transmitter was found, the transmit busy flag bit will be cleared, and the call form the other competing site will be allowed to proceed. If the source of the call is identified, contention arbitration is decided unless the call is an emergency call (decision block 610). If the call is an emergency call, the other existing call (which caused the Transmit Busy flag for that group to be set) is dropped and a warning/diagnostic (drop call) message is generated. If the call is not an emergency call (or if both calls are emergency calls), contention arbitration is accomplished by awarding a win to the call from the highest numbered site (decision block 614). (Site ID numbers are predetermined and assigned when configuring the multi-site network). If the local site is the higher numbered site, the new call is re-routed as a console-only call and a warning/diagnostic (drop call) message is generated (block 612). On the other hand, if the local site has a lower site number, the call from the local site is re-routed as a console-only call and the contention flag is set "TRUE" (block 616).

Whenever a site interface is handling a call that loses contention arbitration, it generates a warning/diagnostic message that contains the basic information from the call (e.g., the calling radio unit, called talk group, site number, and time of call) and re-routes the call only to consoles (so that it can be handled by a system operator).

Figure 7:
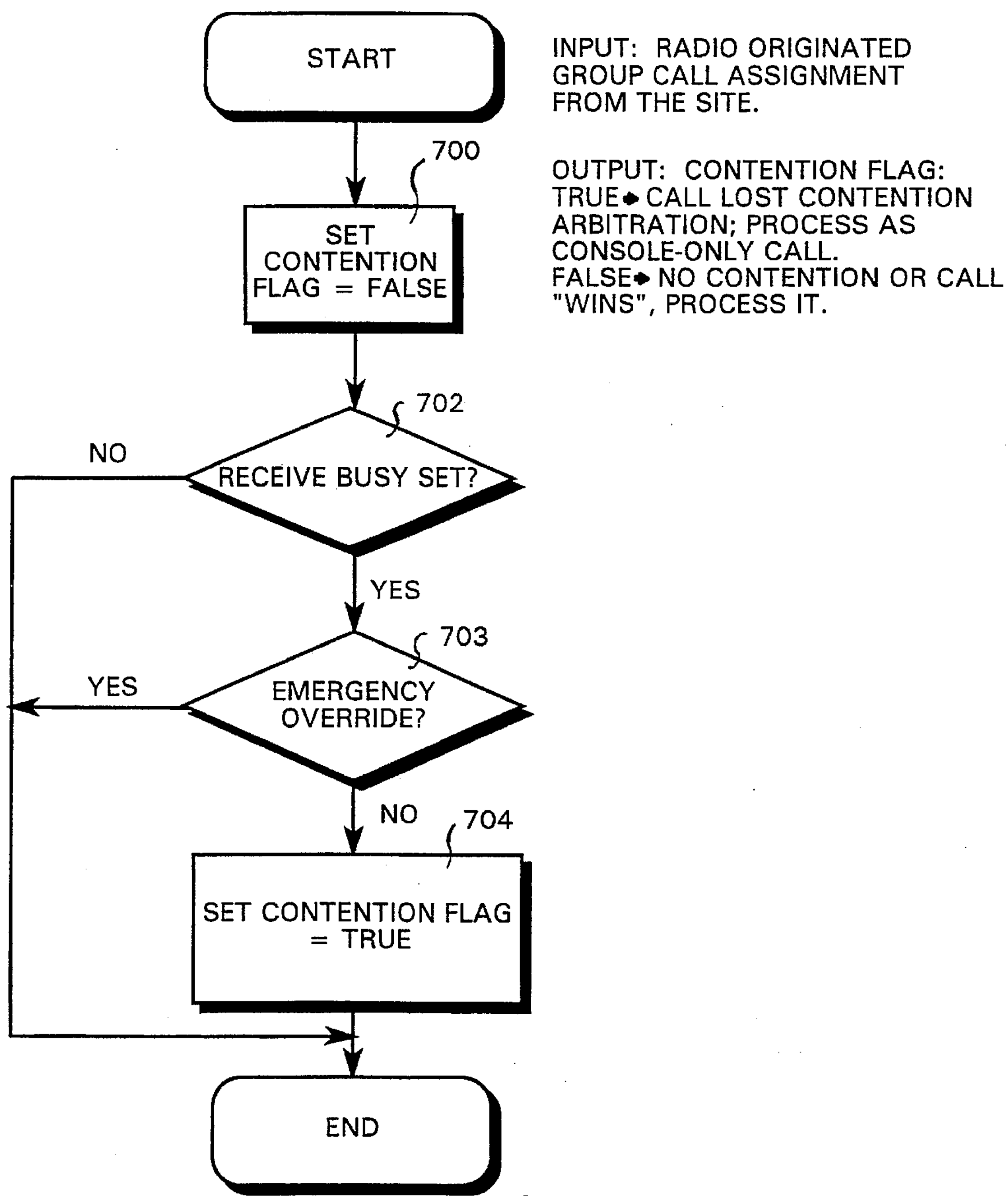
FIG. 7 is a processing flow diagram illustrating Receive Call contention arbitration.

In FIG. 7, an exemplary processing flow diagram illustrating Transmit Call contention arbitration is shown. This procedure is called whenever a mobile radio originated call is received at the interface from the local site. If this procedure detects contention, the incoming call will be re-routed as a console-only call. For the case when no call contention situation exists, the routine simply checks the receive busy flag and returns. Only a few extra lines of program code overhead are executed in addition to the usual call processing execution procedures. Consequently, overall call processing execution time is not significantly increased.

Referring now to the processing flow diagram of FIG. 7, a contention flag is first set to "FALSE" (block 700). Next, the Receive Busy flag for the called group(s) is checked in the tracking database (decision block 702). If the talk group is not busy receiving from a another site (i.e., Receive Busy flag clear) then the call is processed. If the talk group is already busy, the call is allowed through only if it is an emergency call (decision block 703). If the talk group is busy (i.e., Receive Busy flag set), then the call loses contention arbitration, the contention flag is set "TRUE", a warning/diagnostic message is generated and the incoming call is routed as a console-only (block 704).

Figure 8:
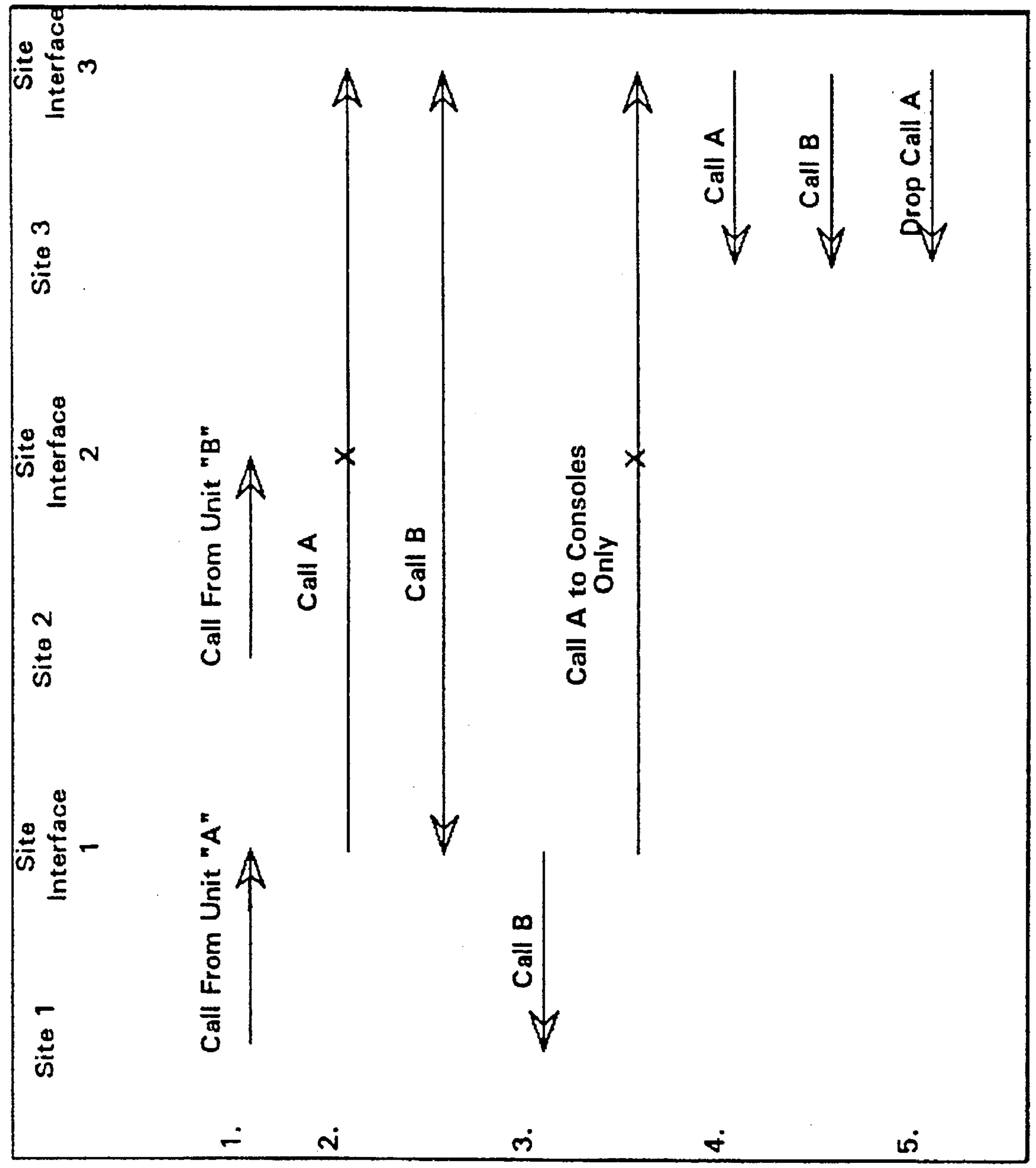
FIG. 8 is an exemplary message flow diagram of a multisite system containing three sites, illustrating the contention situation where calls cross in the multisite switch.
Figure 9:
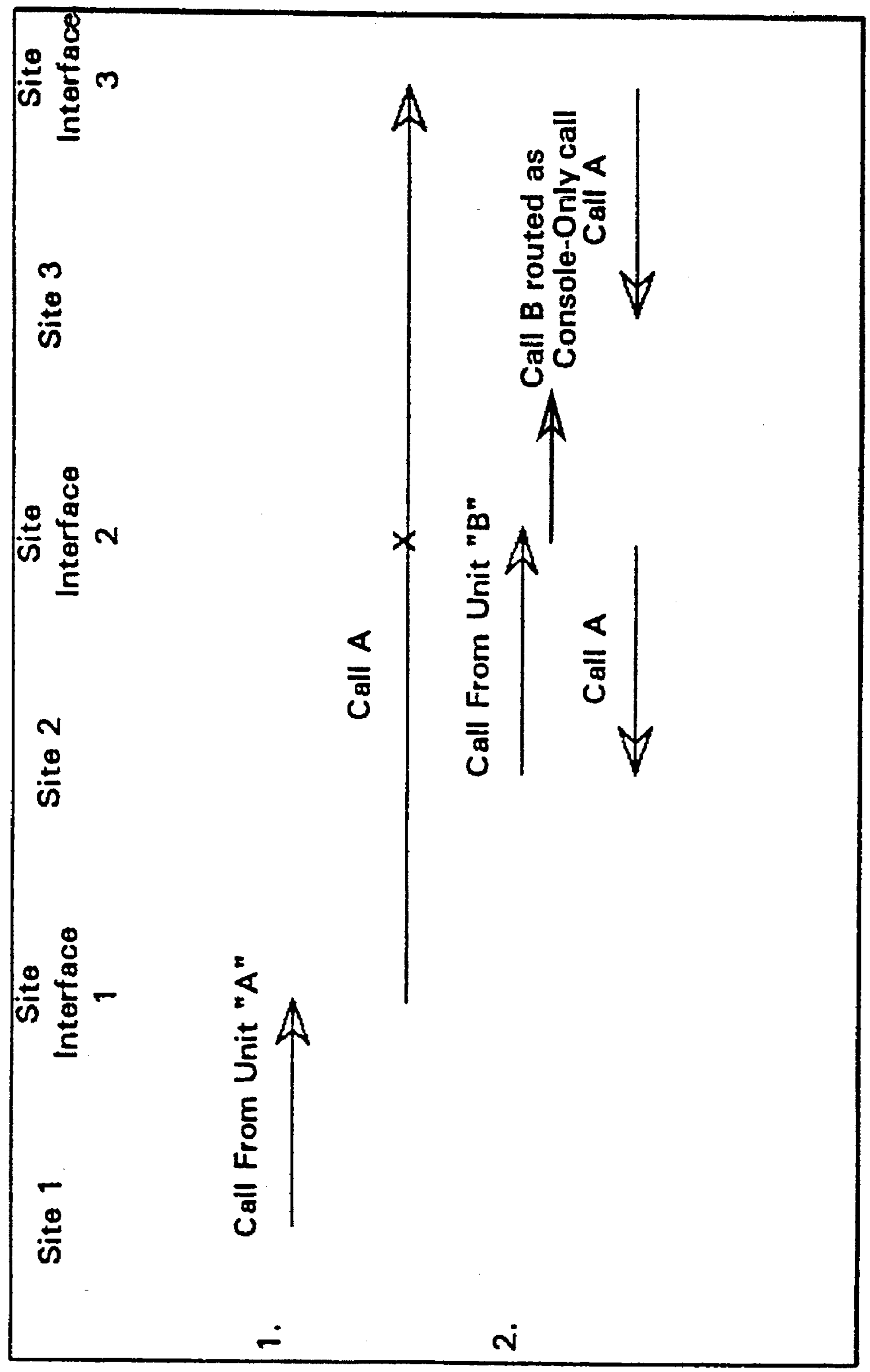
FIG. 9 is an exemplary message flow diagram of a multisite system containing three sites, illustrating the contention situation where calls cross on the site link.
Figure 10:
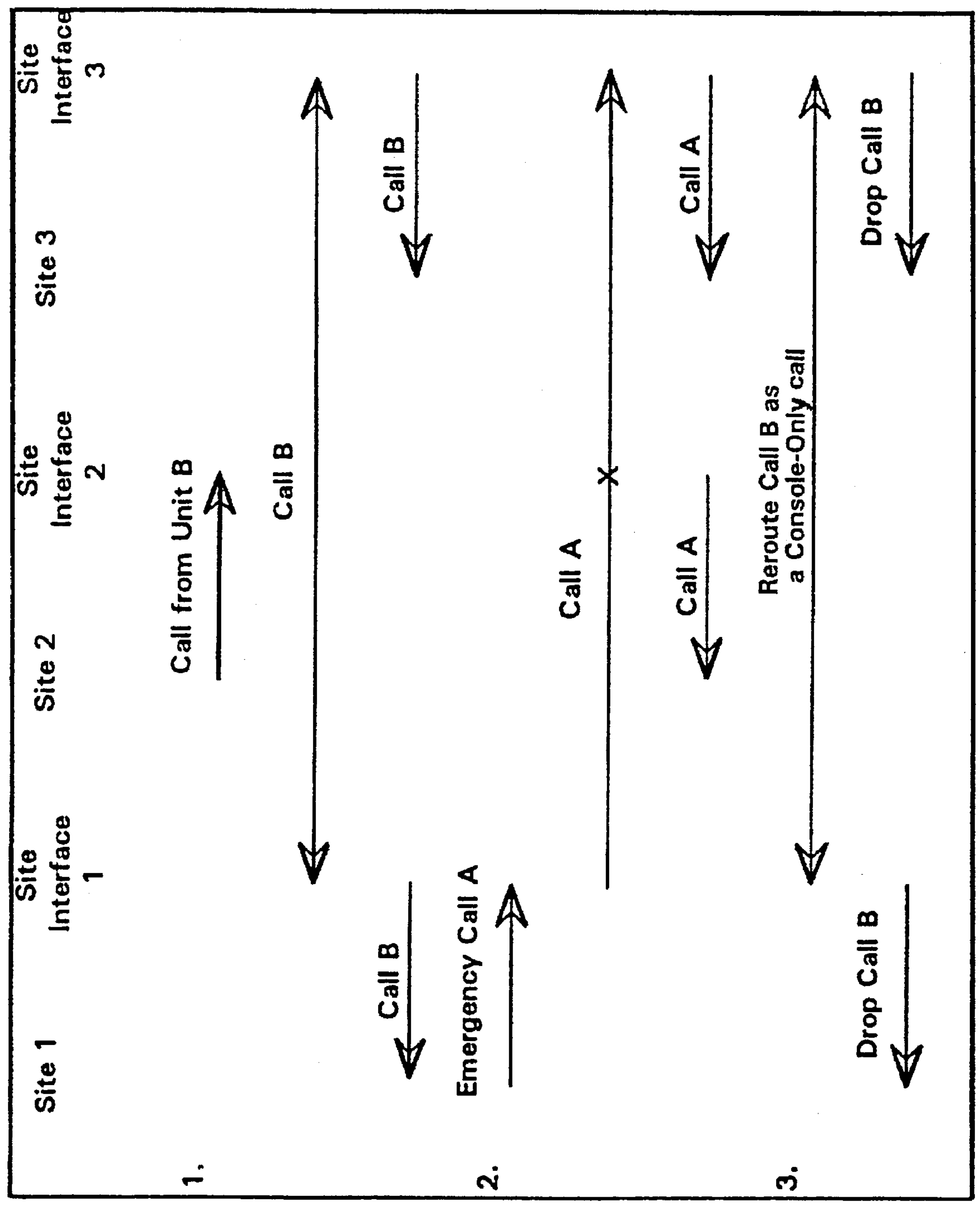
FIG. 10 is an exemplary message flow diagram of a multisite system containing three sites, illustrating the contention situation where an emergency call perempts other calls.

Remaining FIGS. 8–10 illustrate exemplary message flows for arbitration of some possible Group Call (talk group) contention scenarios in a multisite system containing three (3) sites using the described arbitration method in accordance with the present invention. FIG. 8 helps to illustrate the situation where calls cross in the multisite switch (i.e., "tie goes to highest numbered site"). For this situation, a group call is made from unit "A" on site and unit "B" on site 2, to the same talk group at nearly the same moment. Both calls are put on the multisite coordinator's bus. Referring to the event sequence shown in FIG. 8:

1. Calls from mobile units A and B arrive at site 1 and site 2, respectively, for the same talk group at nearly the same moment. The calls are sent to their respective sit interfaces.

2. Both site interfaces place the calls on the multisite switch bus. (Neither site knows about the other's call at this point).

3. Site interface 1 receives call B from site 2. Since call B from site 2 has priority (i.e., "originates from a site with a higher number"), site interface 1 will send call B to site 1 and call A will be re-routed as a console-only call. Site interface 2 receives call A from site 1. Site interface 2 will ignore call A from site 1 since site interface 2 has arbitration priority. (Refer to the Receive Call arbitration flow chart of FIG. 7).

4. Site interface 3 sends both calls to site 3 since there is no contention with a transmission from site 3.

5. Site 3 then receives a "re-route call A as console-only" message from site 1 and drops call A, leaving only call B from site 2. At this point, site 2 is transmitting call B, and sites 1 and 3 are receiving call B. In addition, any console interface modules (not shown) on the multi-site switch bus, which are programmed to receive that call group, will receive both calls A and B.

FIG. 9 illustrates the situation where calls cross on the site link (i.e., "first call wins"). In this example, a call is again originated on sites 1 and 2 at nearly the same moment to the same talk group. However, call B at site 2 was not originated until site 2 interface had already picked up call A from site 1. Referring now to the event sequence shown in FIG. 9:

1. A call arrives at site 1 from mobile unit A and is sent to the site interface 1. The site interface places call A on the multisite switch bus.

2. Site interface 2 picks up call A from site 1 off the multi-site bus and sends it to site 2. A call arrives from Unit B on site 2 and is sent to site interface 2. Site interface 2 will route the call from Unit B onto the multisite switch bus as a console-only call sending call A to its associated site. (Refer to the Transmit Call arbitration flow chart of FIG. 6). Site 3 will not pick up call A. At this point, site 1 is transmitting call A, sites 2 and 3 are receiving call A. Again, console dispatch positions (i.e., console interface modules) that have that Call Group programmed will hear both calls.

FIG. 10 illustrates the situation where an emergency call preempts other calls. In this example, a call arrives from unit B on site 2 and is sent to the other sites. An emergency call is initiated by unit A on site 1 as the call on site 2 is being set up. The emergency call is given arbitration priority over the call from site 2 even though site 2 is the higher numbered site. Referring now to the event sequence shown in FIG. 10:

1. Unit B at site 2 initiates a call. The call is sent to the other sites through the multisite switch.

2. Unit A at site 1 initiates an "emergency call" on the same talk group, as call B is being set up. Site 1 interface puts the call on the multisite switch bus since the emergency call overrides the non-emergency call from the higher site. (Refer to Transmit Call arbitration flow chart of FIG. 6).

3. The site 2 interface receives the emergency call from site 1. The emergency call overrides the call from site 2; consequently, the site 2 interface re-routes its existing transmit call (call B) as a console-only call and picks up the new call. (Refer to receive call arbitration flow chart of FIG. 7). Site 3 picked up both calls but will drop call B on receipt of the drop from site interface 2. At this point, site 1 is transmitting the emergency call and sites 2 and 3 are receiving it. (Console dispatch positions with that Call Group programmed will hear both calls).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a multi-site trunked radio frequency communications network having a plurality of interface nodes for interfacing communications between RF transceiver sites or operator console positions and a multisite communications switching coordinator, a method for resolving radio talk group call contentions in a distributed manner between radios at different sites attempting to transmit on a common talk group, comprising the steps of:

(a) maintaining a data base at each interface node of call and talk group activity information;

(b) arbitrating contention between calls in a common talk group from different sites autonomously at the interface nodes based on a predetermined arbitration scheme implemented at each interface node, wherein said predetermined arbitration scheme awards priority to the first call or, in the event of substantially simultaneous calls to the same talk group, to a call originating from a site having a higher priority number; and (c) processing a call that wins contention arbitration in step (b) as a talk group call.

2. The method for resolving talk group call contentions in a distributed manner as set forth in claim 1, wherein said predetermined arbitration scheme is implemented for a call received from another site interface node where its associated site is already transmitting said call or for a mobile communication unit originated call received for a talk group that is already busy in processing a call on another site.

3. In a multi-site digitally trunked radio frequency communications network including a distributed control multi-site coordinator switch for routing communications between digital repeater sites and other analog/digital communication sources/destinations within the network, a distributed call contention arbitration arrangement, comprising:

a plurality of site interface nodes, each having a data base for storing information relevant to calls routed within the network; and a distributed call arbitrator at each node for arbitrating between calls from callers attempting to transmit on a common talk group at nearly the same moment, wherein an arbitrated call having a highest priority is processed as ordinary multi-site network call, wherein priority is awarded to a first call or, in the event of simultaneous calls to the same talk group, to a call originating from a digital repeater site having a higher priority number.

4. In a multi-site trunked radio frequency communications network having a plurality of interface nodes for interfacing communications between RF transceiver sites or operator console positions and a multisite communications switching coordinator, an arrangement for resolving talk group call contentions in a distributed manner between callers at different sites attempting to transmit on a common talk group, comprising:

a flag bit storage at each interface node for storing digital flag bits associated with each talk group and indicative of at least a receive busy and a transmit busy call status of an associated talk group; and distributed call arbitration means for arbitrating contention between calls in a common talk group from different sites autonomously at each interface node based on a common predetermined arbitration scheme implemented at the interface nodes, wherein said distributed call arbitration means awards priority to the first call or, in the event of substantially simultaneous calls to the same talk group, to a call originating from a site having a higher priority number.

5. A distributed arrangement for resolving talk group call contentions in a multi-site trunked radio frequency communications network, as set forth in claim 4, wherein said arbitration means includes means for setting and testing said flag bits associated with each talk group.

6. A distributed arrangement for resolving talk group call contentions in a multi-site trunked radio frequency communications network, as set forth in claim 4, wherein arbitration means includes means for granting emergency calls priority over non-emergency calls.

7. A communications system, comprising:

a network of one or more communication units associated with a plurality of sites for conducting analog or digital communications;

a digital communications switching coordinator for coordinating communications between multiple sites; and dedicated site interface modules for interfacing communications between said switching coordinator and said communication units, each of said interface modules maintaining a data base for tracking communication unit site and talk group associations, and each interface module implementing an arbitration technique to resolve communication contentions between communication units that are members of a common talk group, wherein said arbitration technique awards priority to the first call or, in the event of substantially simultaneous calls to the same talk group, to a call originating from a site having a higher priority number.

8. A communication system as set forth in claim 7, wherein said data base in each interface node includes at least one pair of contention flag storage bits associated with each talk group and indicative of a receive busy and a transmit busy call status of an associated talk group.

9. In a multi-site trunked radio frequency communications network having a plurality of interface nodes for interfacing communications between RF transceiver sites or operator console positions and a multisite communications switching coordinator, a method for resolving radio talk group call contentions in a distributed manner between radios at different sites attempting to transmit on a common talk group, comprising the steps of:

(a) maintaining a data base at each interface node of call and talk group activity information;

(b) arbitrating contention between calls in a common talk group from different sites autonomously at the interface nodes based on a predetermined arbitration scheme implemented at each interface node;

(c) processing a call that wins contention arbitration in step (b) as a talk group call; and processing one or more calls that lose contention arbitration in step (b) at an operator dispatch console.

10. In a multi-site trunked radio frequency communications network having a plurality of interface nodes for interfacing communications between RF transceiver sites or operator console positions and a multisite communications switching coordinator, a method for resolving radio talk group call contentions in a distributed manner between radios at different sites attempting to transmit on a common talk group, comprising the steps of:

(a) maintaining a data base at each interface node of call and talk group activity information;

(b) arbitrating contention between calls in a common talk group from different sites autonomously at the interface nodes based on a predetermined arbitration scheme implemented at each interface node; and (c) processing a call that wins contention arbitration in step (b) as a talk group call, wherein lower priority calls are processed at a dispatch console.

11. A method for resolving talk group call contentions in a distributed manner between radios at different sites attempting to transmit on a common talk group, comprising the steps of:

(a) maintaining a data base at each interface node of call and talk group activity information;

(b) arbitrating contention between calls in a common talk group from different sites autonomously at the interface nodes based on a predetermined arbitration scheme implemented at each interface node; and (c) processing a call that wins contention arbitration in step (b) as a talk group call, wherein each transceiver site has a unique identification number and said data base maintained at each interface node includes first and second flag bits for each talk group which are indicative of a transmit and a receive status of call requests to each talk group, said method further including steps of:

testing said flag bits upon initiation of a transmit call or a receive call request to determine if a call contention situation necessitating arbitration exits, whereupon a contention situation is indicated if either flag bit is set;

setting said first flag bit associated with a particular talk group in said data base whenever a call originated by a member of said talk group is received from a locally associated transceiver site;

setting said second flag bit associated with a particular talk group in said data base whenever a call is received via the switching coordinator from another interface node in the network;

clearing said flag bits upon receiving an unkey signal indicating termination of a call transmission;

arbitrating call contention whenever a call request is received from another interface node in the network and said first flag bit is found to be set by:

comparing site identification numbers of contending calls, processing a contending call that originated from a site with a higher identification number as an uncontended call, and processing a contending call that originated from a site with a lower identification number only at a console; and arbitrating call contention whenever a call is received from a locally associated transceiver site and said second flag bit is found to be set by processing said call received from said locally associated transceiver site at the console.

* * * * *